United States Patent [19]
Laben et al.

[11] Patent Number: 6,011,875
[45] Date of Patent: Jan. 4, 2000

[54] PROCESS FOR ENHANCING THE SPATIAL RESOLUTION OF MULTISPECTRAL IMAGERY USING PAN-SHARPENING

[75] Inventors: Craig A. Laben, Penfield; Bernard V. Brower, Webster, both of N.Y.

[73] Assignee: Eastman Kodak Company, Rochester, N.Y.

[21] Appl. No.: 09/069,232

[22] Filed: Apr. 29, 1998

[51] Int. Cl.[7] ..................................... G06K 9/36
[52] U.S. Cl. ......................... 382/276; 382/254; 382/278; 382/299
[58] Field of Search .................... 382/275, 276, 382/254, 278, 299; G06K 9/36

[56] References Cited

U.S. PATENT DOCUMENTS

| | | | |
|---|---|---|---|
| 4,706,114 | 11/1987 | Cross | 358/50 |
| 5,568,400 | 10/1996 | Stark et al. | 364/498 |
| 5,761,346 | 6/1998 | Moody | 382/254 |
| 5,805,742 | 9/1998 | Whitsitt | 382/275 |

OTHER PUBLICATIONS

Chavez et al., Comparison of Three Different Methods to Merge Multiresolution and Multispectral Data: Landsat TM Spot Panchromatic, *Photogrammetric Engineering & Remote Sensing*, vol. 57, No. 3, Mar. 1991, pp. 295–303.

D. G. Clayton, "Gram–Schmidt Orthogonalization", *Applied Statistics*, 1974, pp. 335–338.

R. W. Farebrother, "Gram–Schmidt Regression", *Applied Statistics*, 1974, pp. 470–476.

J. Vrabel, "Multispectral Imagery Band Sharpening Study", *Photogrammetric Engineering & Remote Sensing*, vol. 62, No. 9, Sep. 1996, pp. 1075–1083.

J. Vrabel, "Advanced band sharpening study", *SPIE*, vol. 3071, pp. 73–84.

A. Pellemans et al., "Merging Multispectral and Panchromatic SPOT Images with Respect to the Radiometric Properties of the Sensor", *Photogrammetric Engineering & Remote Sensing*, vol. 59, No. 1, Jan. 1993, pp. 81–87.

*Primary Examiner*—Christopher S. Kelley
*Assistant Examiner*—Kanji Patel
*Attorney, Agent, or Firm*—Thomas H. Close

[57] ABSTRACT

The spatial resolution of a multispectral digital image is enhanced in a process of the type wherein a higher spatial resolution panchromatic image is merged with a plurality of lower spatial resolution spectral band images. A lower spatial resolution panchromatic image is simulated and a Gram-Schmidt transformation is performed on the simulated lower spatial resolution panchromatic image and the plurality of lower spatial resolution spectral band images. The simulated lower spatial resolution panchromatic image is employed as the first band in the Gram-Schmidt transformation. The statistics of the higher spatial resolution panchromatic image are adjusted to match the statistics of the first transform band resulting from the Gram-Schmidt transformation and the higher spatial resolution panchromatic image (with adjusted statistics) is substituted for the first transform band resulting from the Gram-Schmidt transformation to produce a new set of transform bands. Finally, the inverse Gram-Schmidt transformation is performed on the new set of transform bands to produce the enhanced spatial resolution multispectral digital image.

8 Claims, 4 Drawing Sheets

PROCESS FOR ENHANCING THE SPATIAL RESOLUTION OF MULTISPECTRAL IMAGERY USING PAN-SHARPENING

FIELD OF THE INVENTION

This invention relates generally to the field of image processing, and in particular to an image processing method for enhancing the spatial resolution of multispectral digital imagery by merging or fusing the data with a higher spatial resolution panchromatic image. This technique is often referred to as band sharpening or pan-sharpening.

BACKGROUND OF THE INVENTION

Past, current, and future air-borne and space-borne imaging systems have the capability to acquire high spatial resolution panchromatic (pan) imagery along with lower spatial resolution, higher spectral resolution, multispectral imagery. Techniques have been developed to increase the spatial resolution of the multispectral data by merging the higher spatial resolution information of the pan image with the multispectral bands through a technique known as pan-sharpening. Pan-sharpening enhances the interpretability and the utility of the multispectral data. Pan-sharpening with a single high spatial resolution pan image also allows the multispectral bands to be acquired at an even lower spatial resolution. This is advantageous in that systems can be designed with lower bandwidth and storage requirements. Lower multispectral spatial resolution can also allow for increased spectral resolution when designing future imaging systems.

In the pan-sharpening process, a lower spatial resolution multispectral image is first registered (if necessary) to a higher spatial resolution pan image. Next, the registered multispectral image is merged with the pan image producing a multispectral image with higher spatial resolution. This merging process usually involves transforming the multispectral bands from the original multispectral band space into an alternative transform space. Image transformations retain all of the information present in the original multispectral bands and the transformed data is often more interpretable than the original data. Once the multispectral bands have been transformed into a transform space, the higher resolution pan image is swapped for (i.e. replaced with) the first transform band and the data is transformed back to original multispectral band space to yield the pan-sharpened multispectral data. Traditional ways of performing pan-sharpening have been shown to increase the spatial resolution of the multispectral data but they also have been shown to alter the spectral integrity of the data. Two widely used pan-sharpening techniques, as described in "Comparison of Three Different Methods to Merge Multiresolution and Multispectral Data", Chavez et al, Photogrammetric Engineering & Remote Sensing, March 1991, pages 295–303, are the Intensity, Hue, and Saturation (IHS) transform technique and the Principle Components (PC) transform technique.

The IHS transform technique is one of the most commonly used methods to pan-sharpen lower resolution multispectral data. In this method, a diagram of which is shown in FIG. 1, three of the total number (N) of low resolution multispectral bands 10 are transformed from original multispectral band space to IHS space 12. The mean digital count ($\mu$) and standard deviation ($\sigma$) of the intensity band (I) are then calculated 14 and the mean and standard deviation of the higher resolution pan image (P) 16 are also calculated 18. The higher resolution pan band is then modified 20 so that the mean and standard deviation of the image match the mean and standard deviation of the intensity band using the equation:

$$\text{ModifiedP} = (P*\text{Gain}) + \text{Bias} \quad (1)$$

where $$\text{Gain} = \frac{\sigma_I}{\sigma_P} \quad (2)$$

and $$\text{Bias} = \mu_I - (\text{Gain}*\mu_P) \quad (3)$$

This modification forces the global statistics of the two images to be similar in an attempt to preserve the spectral characteristics of the original multispectral data. The modified pan image is then swapped for the intensity band 22 and the data is back-transformed into original multispectral band space 24. This technique does improve the spatial resolution of the three lower resolution multispectral bands 26, however, there are two drawbacks to this technique. First, only three multispectral bands can be processed at one time. Hence, this method works well for color imagery which only have a red, green, and blue band, but most multispectral systems have more than three bands. This means that the process must be repeated for each three-band combination a user wishes to produce. Secondly, even though the global statistics of the higher resolution pan band and the intensity band are forced to be similar, the two images still may not look the same (i.e. they may not have similar local statistics). FIG. 2 shows the histograms (i.e. gray level distributions) of two images that visually are very different and yet both have the same global statistics (i.e. mean and standard deviation). This radiometric difference between the intensity band and the pan band may result in a change of spectral information when the IHS bands are back-transformed to original multispectral band space. Colors in certain areas of the pan-sharpened image may not match the colors of the original multispectral data.

The PC transform technique is another commonly used method for pan-sharpening lower resolution multispectral data. In this method, a diagram of which is shown in FIG. 3, all N of the lower resolution multispectral bands 30 are transformed from original multispectral band space into N PC bands 32. The mean and standard deviation of the first PC band (PC1) are then calculated 34 and the mean and standard deviation of the higher resolution pan image 36 are also calculated 38. The higher resolution pan band is then modified 40 in one of two ways. The first way is to modify the pan band so that the mean digital count and standard deviation of the image match the mean and standard deviation of the first PC band using Equations 1–3. The second way is to modify the pan band so that the minimum and maximum digital counts match the minimum and maximum digital counts of the first PC band (i.e. force the data to the same digital count range). This modification again forces the global statistics of the two images to be similar in an attempt to preserve the spectral characteristics of the original multispectral data. The modified higher resolution pan image is then swapped for the first PC band 42, and the data is back-transformed into original multispectral band space 44. This technique has an advantage over the IHS technique in that it improves the spatial resolution of all N of the lower resolution multispectral bands 46 in one process. However, the radiometric accuracy of the first PC band is greater than the radiometric accuracy of the higher resolution pan band.

This results in a loss of radiometric accuracy in the pan-sharpened image when the first PC band is replaced with the modified pan band. Also, even though the global statistics of the higher resolution pan band and the first PC band are similar, the two images may not look the same, so again they will not have similar local statistics. This radiometric difference between the first PC band and the pan band results in a change of spectral information when the PC bands are back-transformed to original multispectral band space. Again, the colors in certain areas of the pan-sharpened image may not match the colors of the original multispectral data.

A good pan-sharpening method should not only increase the spatial resolution of the multispectral data, but it should preserve the spectral integrity of the multispectral data as well. There is a need therefore for an improved pan-sharpening process that increases the spatial resolution of the multispectral imagery while preserving its spectral characteristics.

SUMMARY OF THE INVENTION

The problem is solved according to the present invention by providing a process for enhancing the spatial resolution of a multispectral digital image of the type wherein a higher spatial resolution panchromatic image is merged with a plurality of lower spatial resolution spectral band images. According to the process of the present invention, a lower spatial resolution panchromatic image is simulated and a Gram-Schmidt transformation is performed on the simulated lower spatial resolution panchromatic image and the plurality of lower spatial resolution spectral band images, wherein the simulated lower spatial resolution panchromatic image is employed as the first band in the Gram-Schmidt transformation. The statistics of the higher spatial resolution panchromatic image are adjusted to match the statistics of the first transform band resulting from the Gram-Schmidt transformation and the higher spatial resolution panchromatic image (with adjusted statistics) is substituted for the first transform band resulting from the Gram-Schmidt transformation to produce a new set of transform bands. Finally, the inverse Gram-Schmidt transformation is performed on the new set of transform bands to produce the enhanced spatial resolution multispectral digital image.

ADVANTAGEOUS EFFECT OF THE INVENTION

This invention has two main advantages over previous pan-sharpening techniques. First, there is no limit to the number of bands that can be processed at one time using this technique. Secondly, the spectral characteristics of the lower spatial resolution multispectral data are preserved in the higher spatial resolution, pan-sharpened multispectral data.

DETAILED DESCRIPTION OF THE INVENTION

Figure 1:
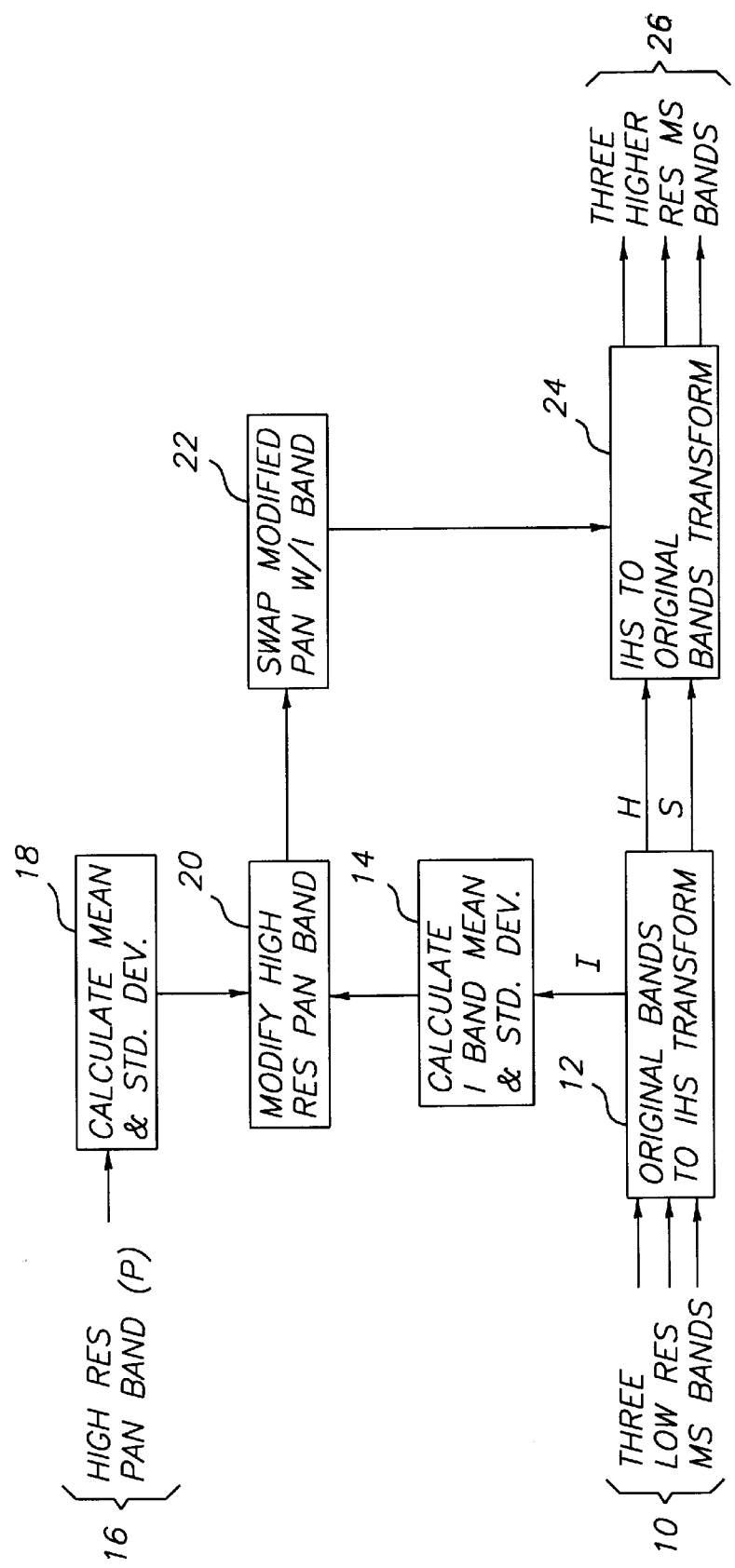
FIG. 1 is a diagram of a prior art Intensity, Hue, Saturation (IHS) transform pan-sharpening method.
Figure 2:
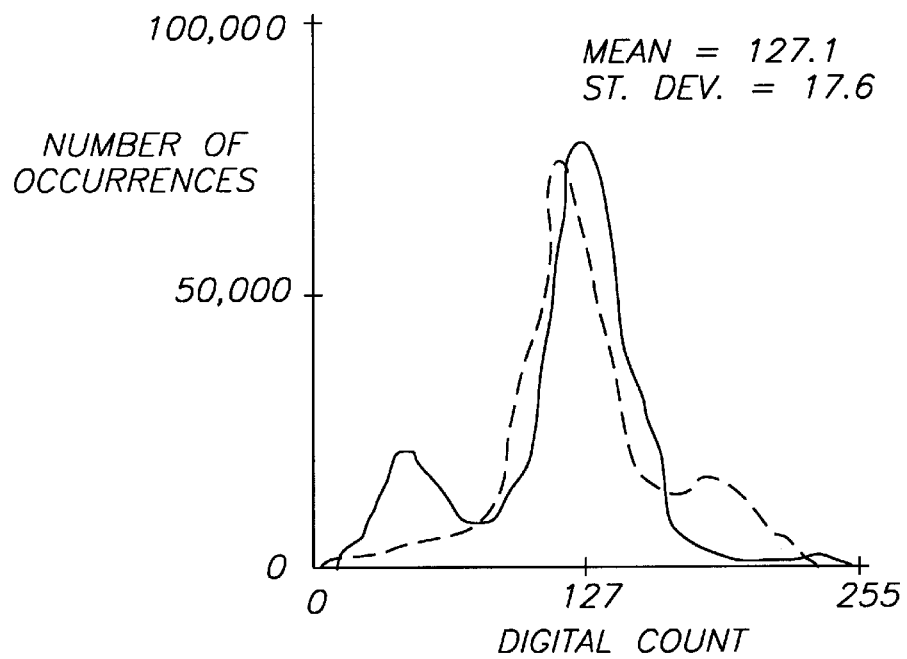
FIG. 2 is a graph showing two histograms of images which look different and have the same minimum digital count, maximum digital count, mean digital count and standard deviation around the mean.
Figure 5:
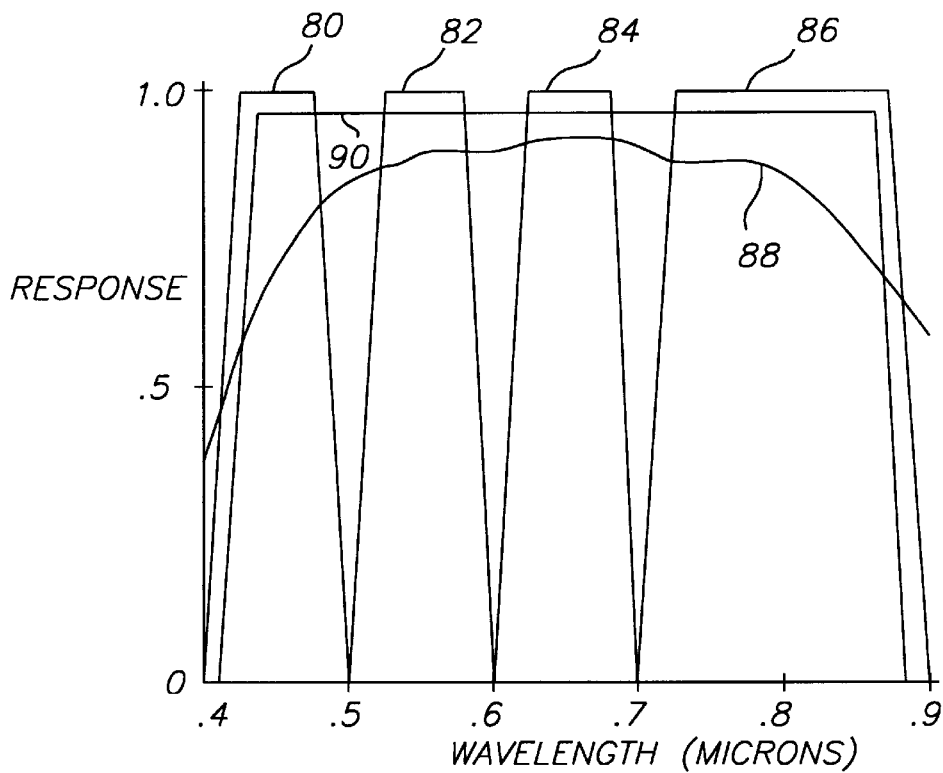
FIG. 5 is a plot of a hypothetical multispectral system's spectral bands, optical transmittance, and detector response.
Figure 3:
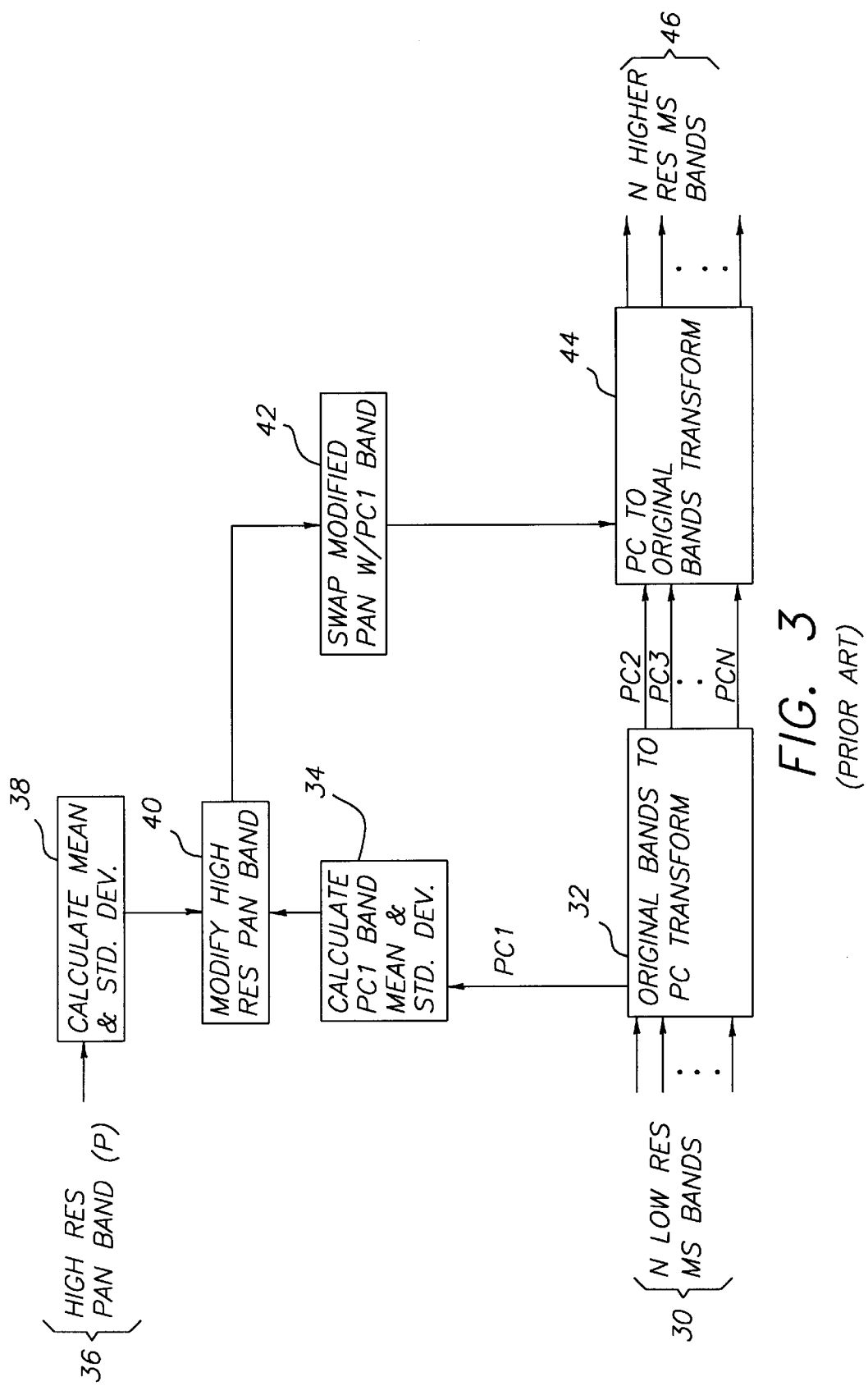
FIG. 3 is a diagram of a prior art Principle Components (PC) transform pan-sharpening method.
Figure 4:
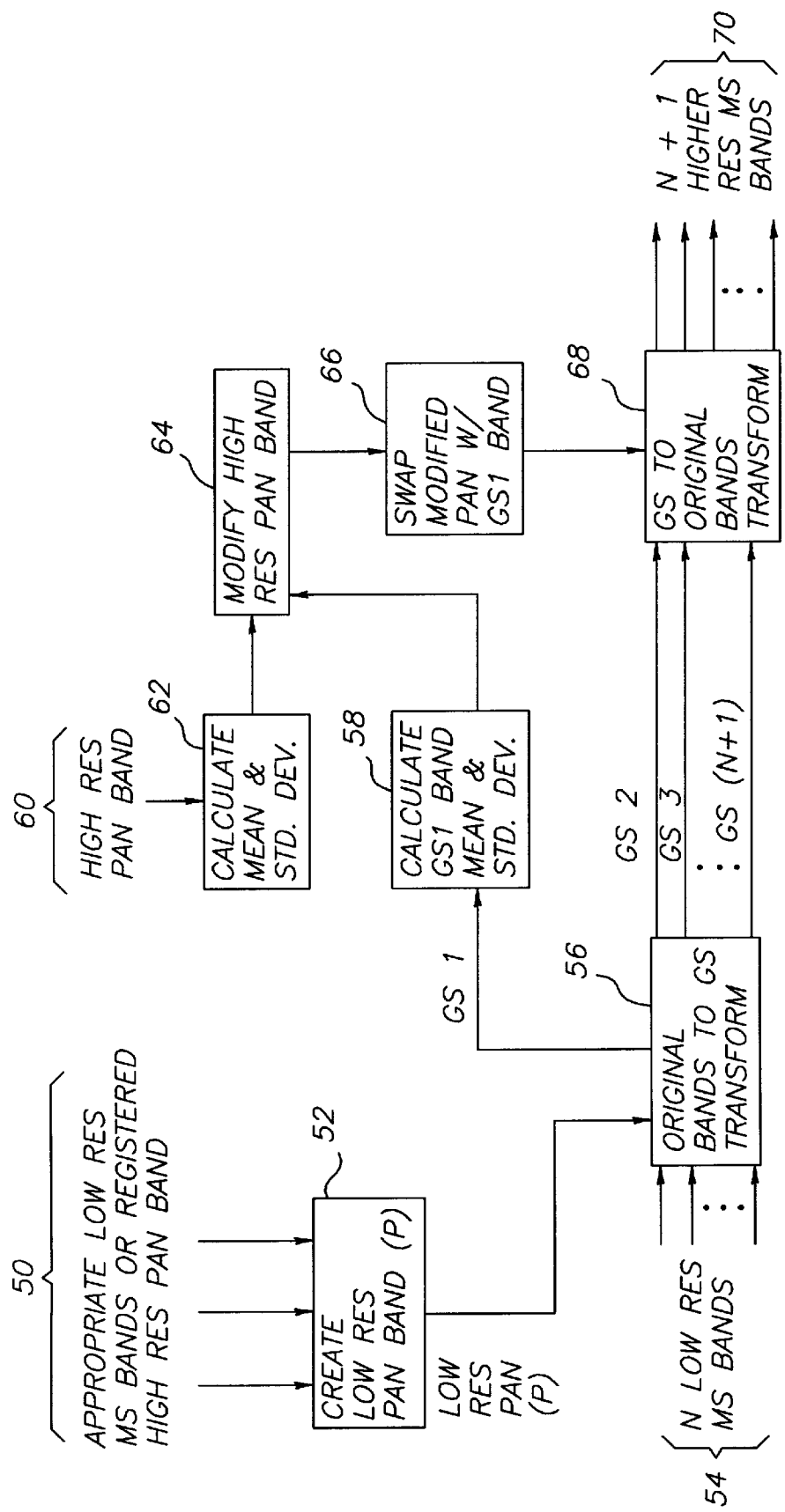
FIG. 4 is a diagram of the pan-sharpening method using the present invention.

A diagram of the Gram-Schmidt transform pan-sharpening technique according to the present invention is shown in FIG. 4. In the discussion that follows, it will be assumed that the images are registered (i.e. points in each image are matched with points in the other images) and that they are of the same scale. If they are not registered, they will need to be registered prior to the processing described below. In this method, a lower resolution pan band is simulated in one of two methods. In the first method, the appropriate lower resolution multispectral bands 50 are combined into a single, simulated lower resolution pan band 52. In order to simulate this lower resolution pan band, appropriate weights need to be calculated and used in the combining process. FIG. 5 shows the spectral response characteristics for a hypothetical four band multispectral system that has an ideal blue (B) 80, green (G) 82, red (R) 84, and near infrared (NIR) 86 band. Also shown in FIG. 5 are the optical transmittance (OT) 88 and the spectral response (SR) of the pan (P) band 90 for the system that is to be simulated. In order to combine the multispectral data into the simulated pan band, weights for each of the four bands can be calculated by:

$$B_{wt} = \int_{0.4}^{0.5} OT_B(\lambda) * SR_B(\lambda) * SR_P(\lambda) \qquad (4)$$

$$G_{wt} = \int_{0.5}^{0.6} OT_G(\lambda) * SR_G(\lambda) * SR_P(\lambda) \qquad (5)$$

$$R_{wt} = \int_{0.6}^{0.7} OT_R(\lambda) * SR_R(\lambda) * SR_P(\lambda) \qquad (6)$$

$$NIR_{wt} = \int_{0.7}^{0.9} OT_{NIR}(\lambda) * SR_{NIR}(\lambda) * SR_P(\lambda) \qquad (7)$$

Once the appropriate weights have been determined, the simulated pan band can be created by:

$$\text{PanBand} = (B*B_{wt}) + (G*G_{wt}) + (R*R_{wt}) + (NIR*NIR_{wt}) \qquad (8).$$

The second method for simulating the lower resolution pan band involves producing it from the higher resolution pan band 50. In this method, the higher resolution pan band is blurred (by the appropriate factor), sub-sampled, and interpolated up to the appropriate scale 52.

The simulated low resolution pan band is now used as the first band of the low resolution multispectral data 54 which is to be input into the original multispectral band to Gram-Schmidt (GS) transform 56 or $$GS1(i,j) = \text{SimulatedPan}(i,j) \qquad (9)$$

where i is the row number and j is the column number, and GS1 is the first Gram-Schmidt transform band.

The Gram-Schmidt transformation, as described by Clayton, in Applied Statistics, 1971, Vol. 20, pages 335–338, and in "The Gram-Schmidt Regression", Farebrother, Applied Statistics, 1974, Vol. 23, pages 470–476, which are incorporated herein by reference, is a common technique used in linear algebra and multivariate statistics. This process is used to orthogonalize matrix data or bands of a digital image. Orthogonalization of the data removes redundant (i.e. correlated) information that is contained in multiple bands. If there were perfect correlation between input bands, the Gram-Schmidt orthogonalization process would produce a final band that contained all zeroes. In the more realistic case of high correlation between bands, the orthogonalization process produces a final band that has very small numbers. For use in this invention, the Gram-Schmidt transformation process has been modified. In the modified process, the mean of each band is subtracted from each pixel in the band before the orthogonalization is performed. This modification produces a more accurate outcome when performing the calculations on a finite precision machine.

In the modified GS process, the $T^{th}$ GS band is constructed from the previous T-1 GS bands, and is given by $$GS_T(i, j) = (B_T(i, j) - \mu_T) - \sum_{l=1}^{T-1} \phi(B_T, GS_l) * GS_l(i, j) \quad (10)$$

where T is the band number being transformed, B is the original band, and $\mu_T$ is the mean of band T given by $$\mu_T = \frac{\sum_{j=1}^{C} \sum_{i=1}^{R} B_T(i, j)}{C * R} \quad (11)$$

where C is the total number of columns in the image, R is the total number of rows is the image, and $\phi(B_T, GS_I)$ is given by $$\phi(B_T, GS_t) = \left[ \frac{\sigma(B_T, GS_I)}{\sigma(GS_I, GS_I)^2} \right] \quad (12)$$

(i.e. the covariance between the given GS band and the original band B, divided by the variance of that GS band).

The mean ($\mu$) and standard deviation ($\sigma$) of the first GS band 58 are then calculated and the mean and standard deviation of the high resolution pan band 60 are also calculated 62 where $$\sigma_T = \sqrt{\frac{\sum_{j=1}^{C} \sum_{i=1}^{R} (B_T(i, j) - \mu_T)}{C * R}} \quad (13)$$

The higher resolution pan image (P) is then stretched 64 so that its mean digital count ($\mu P$) and standard deviation ($\sigma P$) match the mean ($\mu_{GS1}$) and standard deviation ($\sigma_{GS1}$) of the first GS band by Equations 1–3. This stretching will help preserve the spectral characteristics of the original multispectral data. The stretched high resolution pan band and the first GS band, which is actually the simulated low resolution pan band, will look very similar and will have similar global and local statistics. The stretched high resolution pan image is then swapped for the first GS band 66, and the data is transformed back into original multispectral band space 68 producing N+1 higher resolution multispectral bands 70 by $$B_T(i, j) = (GS_T(i, j) + \mu_T) + \sum_{l=1}^{T-1} \phi(B_T, GS_l) * GS_l(i, j) \quad (14)$$

The appropriate three band combinations (e.g. the red, green, and blue band to form a true color image) can now be combined and viewed as needed.

In a preferred embodiment of the invention, the image processing method is implemented by a programmed computer, and the method is sold as a computer program product comprising a computer program stored on a machine readable medium such as a CD Rom or floppy disc.

The invention has been described in detail with particular reference to certain preferred embodiments thereof, but it will be understood that variations and modifications can be effected within the spirit and scope of the invention.

PARTS LIST 10 three low resolution multispectral bands
12 original multispectral band to IHS transform
14 calculate intensity band mean and standard deviation
16 high resolution pan band
18 calculate higher resolution pan band mean and standard deviation
20 modify higher resolution pan band
22 swap modified pan band with the intensity band
24 back-transform from IHS to original multispectral band space
26 three higher resolution multispectral bands
30 N low resolution multispectral bands
32 original multispectral band to PC transform
34 calculate PC band 1 mean and standard deviation
36 high resolution pan band
38 calculate higher resolution pan band mean and standard deviation
40 modify higher resolution pan band
42 swap modified pan band with PC band 1
44 back-transform from PC to original multispectral band space
46 N higher resolution multispectral bands
50 low resolution multispectral bands
52 create lower resolution pan band
54 N low resolution multispectral bands
56 original multispectral band to GS transform
58 calculate GS band 1 mean and standard deviation
60 high resolution pan band
62 calculate higher resolution pan band mean and standard deviation
64 modify higher resolution pan band
66 swap modified pan band with GS band 1
68 back-transform from GS to original multispectral band space
70 N+1 higher resolution multispectral bands
80 hypothetical blue band
82 hypothetical green band
84 hypothetical red band
86 hypothetical NIR band
88 optics transmittance of simulated system
90 pan band of simulated system

What is claimed is:

1. A method of enhancing the spatial resolution of a multispectral digital image of the type wherein a higher spatial resolution panchromatic image is merged with a plurality of lower spatial resolution spectral band images, comprising the steps of:

a) simulating a lower spatial resolution panchromatic image;

b) performing a Gram-Schmidt transformation on the simulated lower spatial resolution panchromatic image and the plurality of lower spatial resolution spectral band images, employing the simulated lower spatial resolution panchromatic image as the first band in the Gram-Schmidt transformation, to produce a plurality of transformed bands;

c) adjusting the statistics of the higher spatial resolution panchromatic image to match the statistics of the first transform band resulting from the Gram-Schmidt transformation to produce a modified higher spatial resolution panchromatic image;

d) substituting the modified higher spatial resolution panchromatic image for the first transform band resulting from the Gram-Schmidt transformation to produce a new set of transform bands; and e) inverse Gram-Schmidt transforming the new set of transform bands to produce the enhanced spatial resolution multispectral digital image.

2. The method claimed in claim 1, wherein the higher spatial resolution panchromatic image differs slightly in scene content from the plurality of lower spatial resolution spectral band images, and wherein the lower spatial resolution panchromatic image is simulated by forming a linear combination of the lower spatial resolution spectral band images.

3. The method claimed in claim 1, wherein lower spatial resolution panchromatic image is simulated by reducing the resolution of the higher spatial resolution panchromatic image.

4. The method claimed in claim 1, wherein the statistics of the higher spatial resolution panchromatic image that are adjusted are the mean and standard deviation.

5. A computer program product, comprising a computer readable storage medium having a computer program stored thereon for enhancing the spatial resolution of a multispectral digital image of the type wherein a higher spatial resolution panchromatic image is merged with a plurality of lower spatial resolution spectral band images, by performing the steps of:

a) simulating a lower spatial resolution panchromatic image;

b) performing a Gram-Schmidt transformation on the simulated lower spatial resolution panchromatic image and the plurality of lower spatial resolution spectral band images, employing the simulated lower spatial resolution panchromatic image as the first band in the Gram-Schmidt transformation, to produce a plurality of transformed bands;

c) adjusting the statistics of the higher spatial resolution panchromatic image to match the statistics of the first transform band resulting from the Gram-Schmidt transformation to produce a modified higher spatial resolution panchromatic image;

d) substituting the modified higher spatial resolution panchromatic image for the first transform band resulting from the Gram-Schmidt transformation to produce a new set of transform bands; and e) inverse Gram-Schmidt transforming the new set of transform bands to produce the enhanced spatial resolution multispectral digital image.

6. The computer program product claimed in claim 5, wherein the higher spatial resolution panchromatic image differs slightly in scene content from the plurality of lower spatial resolution spectral band images, and wherein the lower spatial resolution panchromatic image is simulated by forming a linear combination of the lower spatial resolution spectral band images.

7. The computer program product claimed in claim 5, wherein lower spatial resolution panchromatic image is simulated by reducing the resolution of the higher spatial resolution panchromatic image.

8. The computer program product claimed in claim 5, wherein the statistics of the higher spatial resolution panchromatic image that are adjusted are the mean and standard deviation.

* * * * *